(No Model.)
F. M. COOMBS.
CAR COUPLING.
No. 520,393. Patented May 22, 1894.
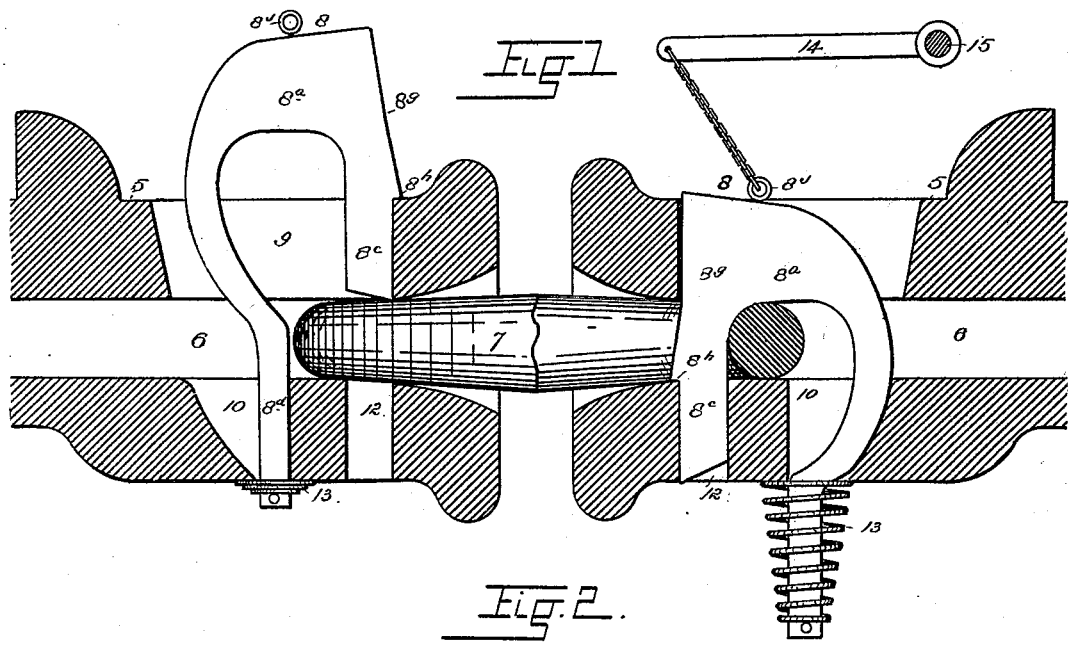
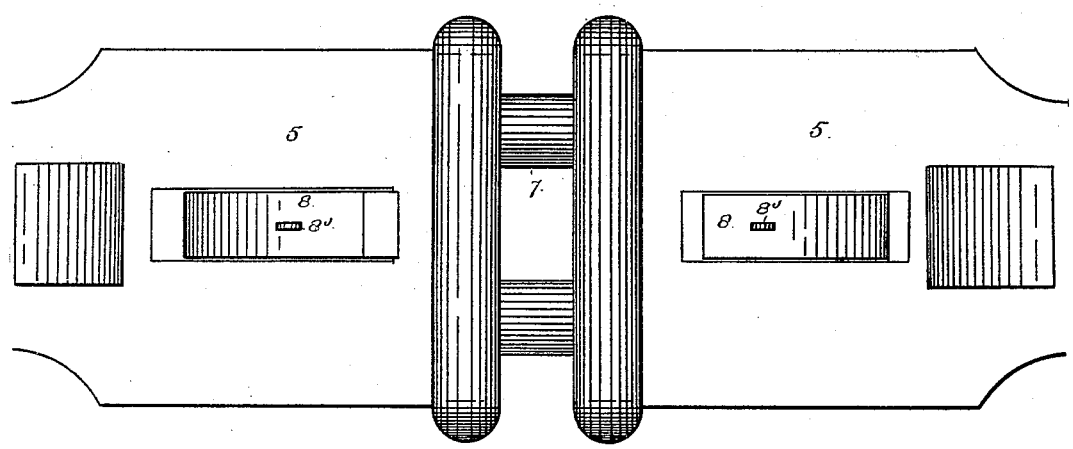
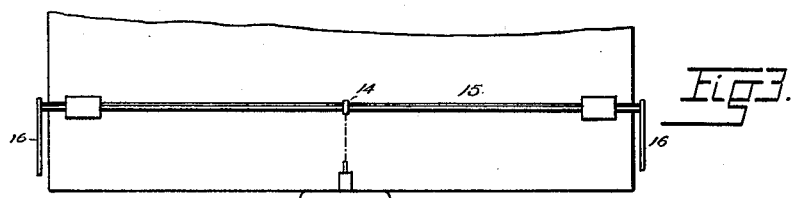
Witnesses
Chas. E. Dawson
G. J. Ollandt
Inventor
F. M. Coombs
By his Attorney
A. J. O'Brien

United States Patent Office.

FREDERICK M. COOMBS, OF ASPEN, COLORADO.

CAR-COUPLING.

SPECIFICATION forming part of Letters Patent No. 520,393, dated May 22, 1894.

Application filed January 3, 1894. Serial No. 495,563. (No model.)

*To all whom it may concern:*

Be it known that I, FREDERICK M. COOMBS, a citizen of the United States of America, residing at Aspen, in the county of Pitkin and State of Colorado, have invented certain new and useful Improvements in Car-Couplers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in car-couplers, and my object is to provide a device which shall be simple in construction, economical in cost, reliable, durable, efficient in use, and perfectly automatic in operation.

To this end, my improved coupler consists of the features, arrangements and combinations hereinafter described and claimed all of which will be fully understood by reference to the accompanying drawings in which is illustrated an embodiment thereof.

In these drawings, Figure 1 is a vertical longitudinal section taken through two adjacent draw-bars, the coupling hooks being shown in elevation, and the link partly in section. Fig. 2 is a top or plan view of the same. Fig. 3 is an end view shown on a small scale with my coupling device applied.

Similar reference characters indicating corresponding parts or elements of the mechanism in the several views, let the numeral 5 designate the draw-bar longitudinally recessed as shown at 6 to receive the link 7 which is largest at its central portion and tapers gradually toward the ends. The object of this shape is to cause the link to maintain a horizontal position ready to enter the link recess of the opposite draw-bar. The end of the link being smallest, will readily enter the draw-bar to the locking position. The portion of the link, however, nearer the center and engaging the mouth of the draw-bar, fits quite closely therein, whereby the free outer extremity of the link is held up in position to enter the draw-bar of the opposite car. In Fig. 1, one side of the link is shown broken away at the center. The draw-head is vertically apertured to receive the coupling device 8; the upper part of the draw-head is provided with a single aperture 9, while the lower part has two apertures 10 and 12. The coupling device is composed of the head $8^a$, the hook $8^c$ and the stem $8^d$. The aperture 9 of the draw-head is adapted to receive the head $8^a$ of the coupling device, while the apertures 10 and 12 are fashioned to receive the stem and hook thereof respectively. The stem of the coupling device projects through the aperture 10 of the draw-head and is surrounded by the coil spring 13 which bears against the bottom of the draw-head at one extremity, while its opposite extremity engages a pin 14 with which the lower extremity of the stem is provided. The face of the coupling device is inclined or beveled as shown at $8^g$ and terminates in a sharp off-set or ledge $8^h$ which engages the upper part of the draw-head and supports the hook in the upraised or uncoupled position as indicated at the left in Figs. 1 and 2. As the link extremity enters the longitudinal recess in the draw-head and engages the upraised coupling device, the latter is forced backward sufficiently to free its off-set support from engagement with the draw-head, when the coupling device suddenly assumes the coupled position as shown at the right in Figs. 1 and 2. This downward movement is accomplished by gravity, supplemented by the spring 13, which, being placed under tension when the device is raised, will, as soon as it is released, cause the device to assume the coupled position, the hooked portion passing through the opening in the link and thence downward into the aperture 12 in the lower part of the draw-head, the off-set $8^h$ resting upon the lower part of the draw-head in the link's recess.

The coupling device is raised from the locked position for the purpose of uncoupling the cars, by the movement of an arm 14 made fast to a bar 15 extending across the end of the car to which it is suitably journaled. The extremities of the bar are provided with cranks 16 located outside the car, and whereby a partial rotation may be imparted to the bar for the purpose of raising the coupling device which is connected with the outer extremity of the arm 14 by a chain 17, the upper extremity of the coupling device being provided with an eye $8^j$ to facilitate the attachment of the chain.

When the coupling device is in the locked position, the chain extends forward from the eye 8¹, whereby in raising the device, there will be a tendency to draw it forward, so that as soon as it has reached a position sufficiently elevated, its off-set will engage the top of the draw-head in front of the aperture 9.

Having thus described my invention, what I claim is—

1. In a car-coupler, the combination with the draw-head and link, of the vertically movable spring-actuated hooked coupling device provided with the off-set in front, the draw-head being suitably apertured to receive said device, substantially as described.

2. In a car-coupler, the combination with the draw-head longitudinally recessed and vertically apertured, the link centrally enlarged and tapering toward its extremities, and the vertically movable, spring-actuated coupling device provided with the off-set adapted to engage the draw-head which forms the support for the device when in the upraised position, substantially as described.

3. The bevel-faced hook-shaped coupling device provided with the supporting off-set in front, substantially as described.

4. In a car coupling, the combination with the draw-head of the vertically movable coupling device provided with the supporting off-set in front, and the coupling link centrally enlarged, and tapering toward its extremities, substantially as described.

In testimony whereof I affix my signature in the presence of two witnesses.

FREDERICK M. COOMBS.

Witnesses:
G. J. ROLLANDET,
CHAS. E. DAWSON.